US012579019B2

(12) United States Patent
Suryanarayana et al.

(10) Patent No.: US 12,579,019 B2
(45) Date of Patent: Mar. 17, 2026

(54) SMART SURVEILLANCE SERVICE IN PRE-BOOT FOR QUICK REMEDIATIONS

(71) Applicant: Dell Products L.P., Round Rock, TX (US)

(72) Inventors: Shekar Babu Suryanarayana, Bangalore (IN); Sagar Alatgi, Pune (IN); Aniket Surekar, Nanded (IN)

(73) Assignee: Dell Products L.P., Round Rock, TX (US)

( * ) Notice: Subject to any disclaimer, the term of this patent is extended or adjusted under 35 U.S.C. 154(b) by 39 days.

(21) Appl. No.: 18/472,868

(22) Filed: Sep. 22, 2023

(65) Prior Publication Data

US 2025/0103419 A1     Mar. 27, 2025

(51) Int. Cl.
*G06F 11/00* (2006.01)
*G06F 11/07* (2006.01)
*G06F 11/14* (2006.01)

(52) U.S. Cl.
CPC ........ *G06F 11/079* (2013.01); *G06F 11/0793* (2013.01); *G06F 11/1417* (2013.01)

(58) Field of Classification Search
CPC .............. G06F 11/079; G06F 11/0793; G06F 11/1417; G06F 11/0751
See application file for complete search history.

(56) References Cited

U.S. PATENT DOCUMENTS

| | | | | |
|---|---|---|---|---|
| 8,812,828 | B2 * | 8/2014 | Datta ...................... | G06F 21/00 713/2 |
| 10,365,961 | B2 * | 7/2019 | Cady .................. | G06F 11/0775 |
| 10,713,061 | B2 * | 7/2020 | Zhan ...................... | G06F 9/4408 |
| 11,301,258 | B2 * | 4/2022 | Suryanarayana ...... | G06N 20/00 |
| 11,334,419 | B1 * | 5/2022 | Suryanarayana ... | G06F 11/0793 |
| 11,507,455 | B2 * | 11/2022 | Moorthy ............. | G06F 11/1438 |
| 11,599,436 | B2 * | 3/2023 | Chaiken ............... | G06F 11/079 |
| 11,875,172 | B2 * | 1/2024 | Voltz ..................... | G06F 9/4406 |
| 12,061,911 | B2 * | 8/2024 | Vidyadhara ......... | G06F 9/45533 |
| 2002/0095625 | A1 * | 7/2002 | Ahrens ................. | G06F 11/006 714/E11.026 |
| 2012/0124356 | A1 * | 5/2012 | Datta .................. | G06F 11/0793 713/2 |
| 2016/0335151 | A1 * | 11/2016 | Swierk ................... | G06F 21/50 |
| 2016/0350166 | A1 * | 12/2016 | Andrews ................ | G06F 11/22 |
| 2020/0218544 | A1 * | 7/2020 | Ganesan ............. | G06F 13/4221 |
| 2020/0218613 | A1 * | 7/2020 | Lambert ............. | G06F 11/1417 |
| 2021/0240561 | A1 * | 8/2021 | Shah ................... | G06F 11/0793 |
| 2021/0406113 | A1 * | 12/2021 | Chaiken ............. | G06F 11/0793 |
| 2023/0205886 | A1 * | 6/2023 | Koelewyn ............. | G06F 11/362 726/22 |
| 2023/0229558 | A1 * | 7/2023 | Warkentin .......... | G06F 11/0757 714/55 |
| 2023/0351019 | A1 * | 11/2023 | Paulraj .................. | G06F 9/4401 |
| 2024/0020198 | A1 * | 1/2024 | Suryanarayana ... | G06F 11/1417 |
| 2024/0143435 | A1 * | 5/2024 | Poosapalli .......... | G06F 11/0721 |
| 2025/0103419 | A1 * | 3/2025 | Suryanarayana ..... | G06F 11/079 |

* cited by examiner

*Primary Examiner* — Jonathan D Gibson
(74) *Attorney, Agent, or Firm* — Jackson Walker L.L.P.

(57) ABSTRACT

An information handling system may include a host central processing unit (CPU); and a non-CPU processing unit. The information handling system may be configured to, during execution of a pre-boot environment: perform boot tasks on the host CPU; and perform diagnostic tasks on the non-CPU processing unit. The non-CPU processing unit may be an application processing unit (APU) and/or a graphics processing unit (GPU).

15 Claims, 4 Drawing Sheets

| APU2 | | MEMORY TRAINING ERRORS<br>BOARD INIT ERRORS | DEVICE CONFIG ERRORS<br>FIRMWARE CORRUPTION ERROR | BOOT LOADER ERRORS<br>FILE SYSTEM ERROR | BSOD<br>PAGE FAULT |
| CPU1 | TPM VERIFICATION | CPU INIT<br>CHIPSET INIT<br>BOARD INIT | DEVICE, BUS DRIVER INIT EXECUTION | LOCATE BOOT DEVICES | RUN TIME SERVICES |
| | SEC | PEI | DXE | BDS | OS-RT |

FIG. 3

SMART SURVEILLANCE SERVICE IN PRE-BOOT FOR QUICK REMEDIATIONS

TECHNICAL FIELD

The present disclosure relates in general to information handling systems, and more particularly to providing diagnostics (also referred to as surveillance) of a pre-boot environment such as a Unified Extensible Firmware Interface (UEFI) Basic Input/Output System (BIOS).

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portions of this disclosure may be used in conjunction with techniques described in U.S. patent application Ser. No. 18/473,097, entitled "SECURE HANDSHAKE FOR HOST TO NON-HOST EXECUTION," which is being filed concurrently herewith and is incorporated by reference herein in its entirety.

Current implementations of pre-boot surveillance in information handling systems are somewhat lacking. For example, it would be advantageous if the pre-boot firmware environment could utilize all processors present in a system to perform live monitoring of the system and continuously learn from its behavior. For example, such a surveillance system might be able to capture information about unexpected slowdowns in the firmware execution, errors, etc., and report them to a monitoring service.

The Multiprocessor (MP) Protocol is a part of the UEFI Specification. It provides a standard way for the operating system (OS) to discover and manage multiple processors or cores in a system. An information handling system may use the MP Protocol to determine the number and type of processors in the system and configure them for use in the PEI pre-boot phase. The protocol also provides services for controlling the execution of code on specific processors or cores, including starting and stopping them and setting their priority in the DXE pre-boot phase.

In current systems, however, various limitations are present regarding surveillance of the pre-boot environment.

1. There is no surveillance system which will monitor the boot path and immediately provide remediation for failures occurring in the pre-boot environment.

2. There is no connectivity available in the early pre-boot phases, because the Bluetooth/Wi-Fi/Network stack all are initialized in the late DXE phase, and thus there are limitations for any telemetry in the PEI and early DXE phases.

3. In current systems, it may be necessary to wait for the OS to boot to send logged telemetry events, which limits complete auto healing capabilities during boot and implemented via the pre-boot environment.

4. Currently, there is no mechanism to perform BIOS diagnostics in parallel during the boot process execution, and so diagnostics take a longer time than would be ideal.

5. In modern systems, the boot process executes using one CPU, leaving any other CPUs or cores idle, instead of using them for learning the boot paths and remediation of platforms in case of any failure in booting of the system.

Embodiments thus improve on existing techniques in the context of pre-boot surveillance.

It is to be noted that various terms discussed herein are described in the UEFI Specification Version 2.10, released August 2022 (hereinafter, UEFI Specification), which is hereby incorporated by reference in its entirety. One of ordinary skill in the art with the benefit of this disclosure will understand its applicability to other specifications (e.g., prior or successor versions of the UEFI Specification). Further, some embodiments may be applicable to different technologies other than UEFI.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with pre-boot surveillance in information handling systems may be reduced or eliminated.

In accordance with embodiments of the present disclosure, an information handling system may include a host central processing unit (CPU); and a non-CPU processing unit. The information handling system may be configured to, during execution of a pre-boot environment: perform boot tasks on the host CPU; and perform diagnostic tasks on the non-CPU processing unit.

In accordance with these and other embodiments of the present disclosure, a method may include an information handling system that includes a host central processing unit (CPU) and a non-CPU processing unit executing a pre-boot environment; during execution of the pre-boot environment, the information handling system performing boot tasks on the host CPU; and during execution of the pre-boot environment, the information handling system performing diagnostic tasks on the non-CPU processing unit.

In accordance with these and other embodiments of the present disclosure, an article of manufacture may include a non-transitory, computer-readable medium having computer-executable code thereon that is executable by at least one processor of an information handling system for: executing a pre-boot environment; during execution of the pre-boot environment, performing boot on tasks a host central processing unit (CPU) of the information handling system; and during execution of the pre-boot environment, performing diagnostic tasks on a non-CPU processing unit of the information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates an example of processes executed by different processors in a SEC phase, a PEI phase, a DXE phase, a BDS phase, and an OS-RT phase of boot, in accordance with embodiments of the present disclosure.

DETAILED DESCRIPTION

Figure 1:
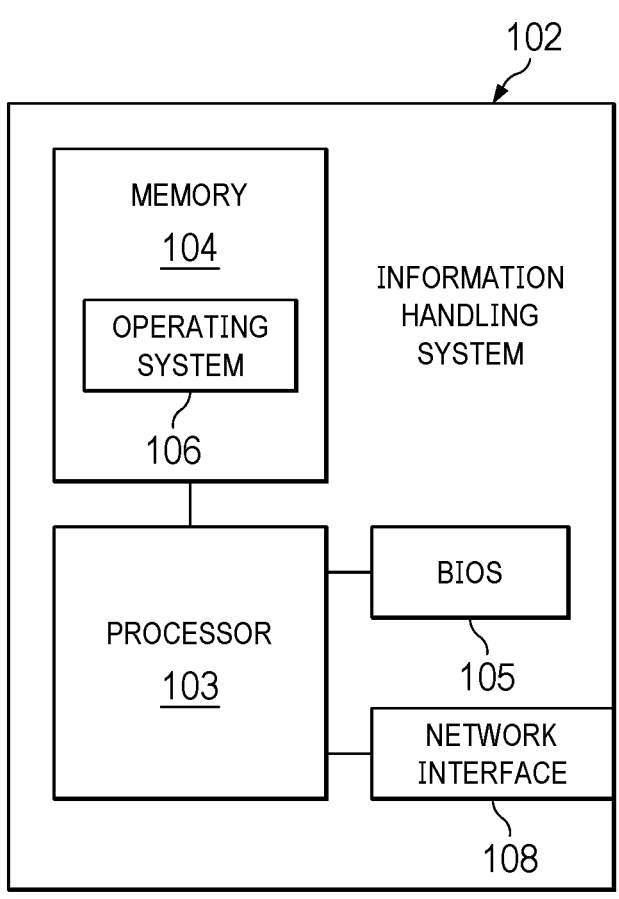
FIG. 1 illustrates a block diagram of an example information handling system, in accordance with embodiments of the present disclosure.

Preferred embodiments and their advantages are best understood by reference to FIGS. 1 through 4, wherein like numbers are used to indicate like and corresponding parts.

For the purposes of this disclosure, the term "information handling system" may include any instrumentality instrumentalities operable to compute, or aggregate of classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

In some embodiments, information handling system 102 may include more than one processor 103. For example, one such processor 103 may be a CPU, and other processors 103 may include various other processing cores such as application processing units (APUs) and graphics processing units (GPUS). Embodiments of this disclosure may provide a method to dynamically initialize such processors during the early phases of a pre-boot environment to enable their use in parallel execution to reduce boot time. Further, a smart surveillance method may be loaded in the early PEI phase and may start continuous monitoring services for remediation readiness without disturbing current boot performance. A method is presented to create a connected pre-boot environment utilizing the Bluetooth/Wi-Fi stack in the late PEI phase for live telemetry. A method is presented to dynamically provide a parallel processing platform for faster diagnostics and quick healing.

Thus embodiments allow faster boot with smart surveillance without disturbing the existing boot path performance. As part of the smart cloud ecosystem, the early PEI phase APU and GPU initialization method to bring up the Bluetooth (e.g., BLE) and/or Wi-Fi stack enables cloud connectivity for telemetry and learning. Surveillance as a service in the pre-boot environment may perform cloud connections for continuous synchronization and faster remediations of any problems encountered by information handling system 102. A symmetric multiprocessing platform creates concurrent diagnostics and quick healing.

According to one embodiment, the PEI firmware may detect the CPU and identifies its characteristics, such as the number of cores and their specific features, and configure the CPU's control registers, cache parameters, and memory management units (MMUs) to ensure efficient memory access.

After the APU initialization, the PEI firmware does GPU initialization with memory interface, allocating resources and setting up memory controllers.

Figure 2:
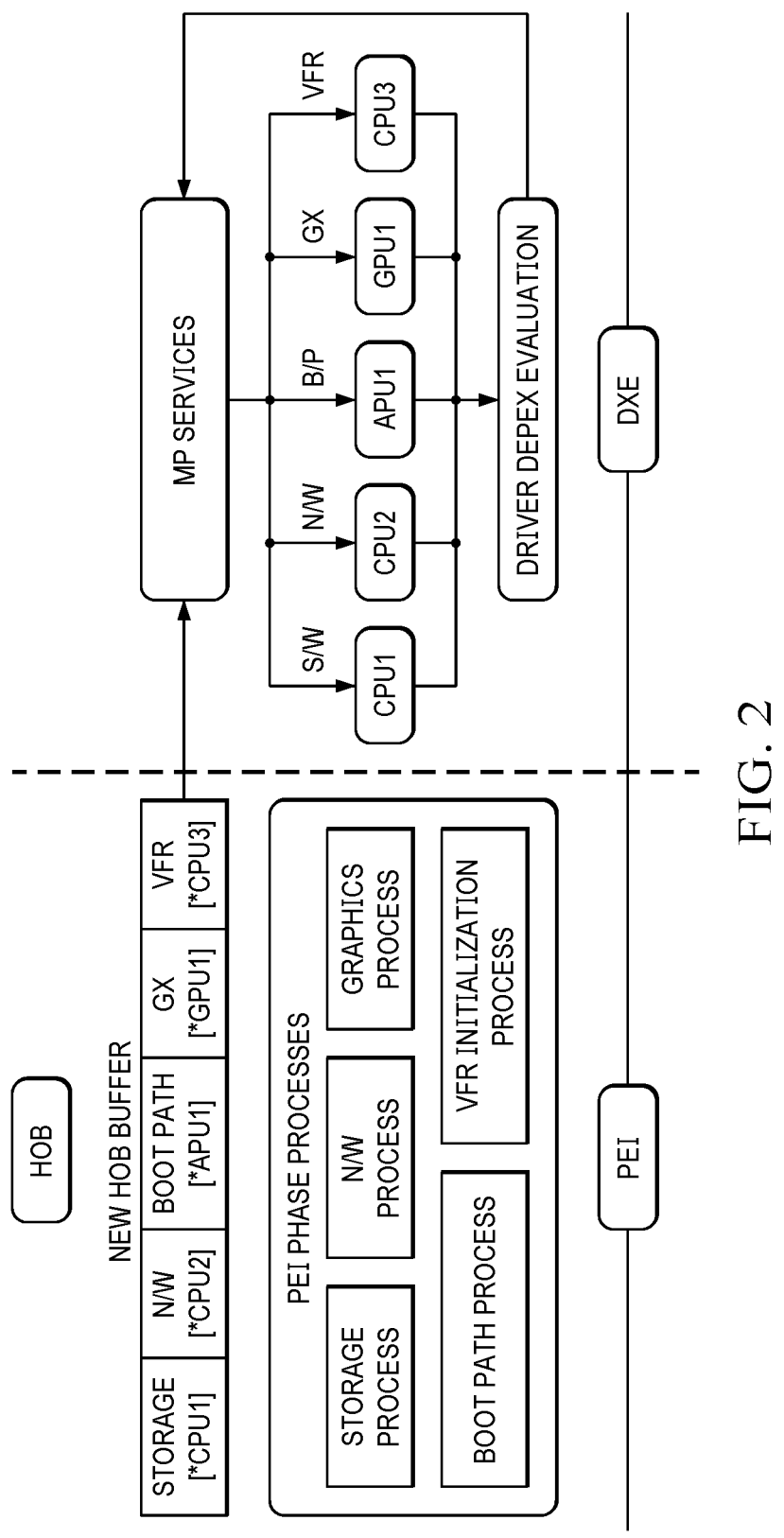
FIG. 2 illustrates an example of processes executed by different processors in a PEI phase and a DXE phase of boot, in accordance with embodiments of the present disclosure.

FIG. 2 provides an illustration of one embodiment.

During this PEI boot stage, MP services may identify the number of processors or processor cores present in the system. It collects information about each processor and provides data about the number of cores, their types, and local APIC (Advanced Programmable Interrupt Controller) IDs and saves this information in a data structure. This processor-specific data may assign the APIC ID to the BIOS process which will be stored in a hand-off buffer (HOB) and passed to the MP services in the DXE phase.

In the DXE phase, the MP service protocol assigns a BIOS process to the respective APIC ID of the processors identified in the HOB. The MP services functions may be called, and the process will be scheduled for execution on the specified processors or cores. As shown, storage may be assigned to CPU1, networking may be assigned to CPU2, boot path may be assigned to APU1, graphics may be assigned to GPU1, and processing of the visual forms representation (VFR) may be assigned to CPU3.

Thus, embodiments may ensure that all the CPUs and/or APUs and/or GPUs are utilized efficiently, and multiple drivers are handled in parallel by all CPUs and APUs, achieving a true multi-processing system in the pre-boot environment.

FIG. 3 provides an example of different tasks that may be carried out by a particular CPU core and a particular APU core during the various phases of boot. In the SEC phase, CPU1 may carry out the Trusted Platform Module (TPM) verification.

After the initialization of APU2, a surveillance service may run on APU2 creating an event logging queue, which will be utilized by the different BIOS drivers to capture relevant events and enqueue them in the event queue. These events can include hardware initialization progress, firmware status, error conditions, security-related events, or specific debug information. This service may continue logging events up until the ExitBootServices( ) event.

Monitoring data collected by the service running on APU2 may be compared to identify differences in event patterns and provide quick remediations to recover from failures and automatically address any problems encountered by the system. This surveillance process may run concurrently on APU2 without disturbing the existing boot path, which may be handled by CPU1.

Figure 4:
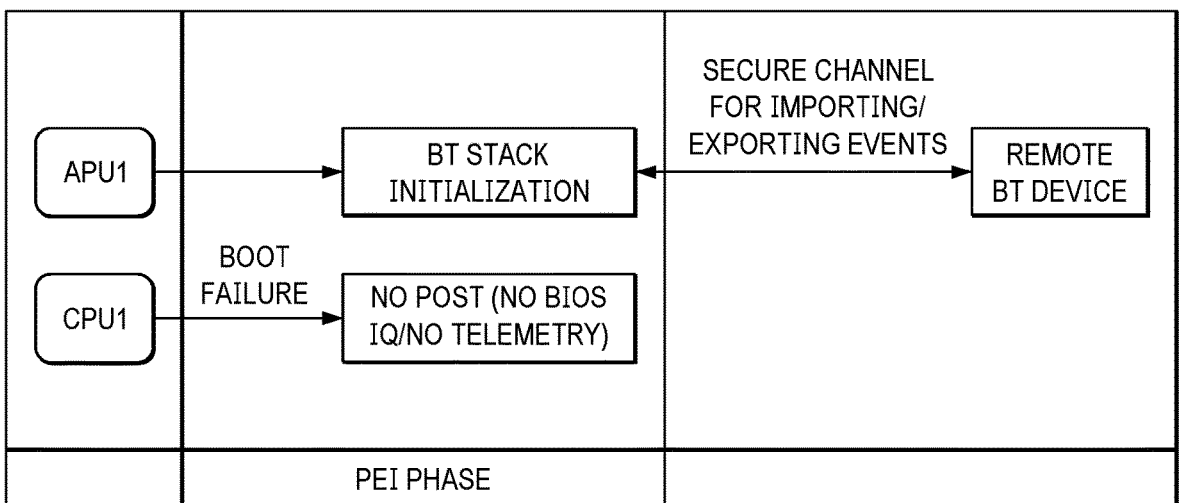
FIG. 4 illustrates an example of transmitting telemetry information to a remote device, in accordance with embodiments of the present disclosure.

FIG. 4 provides an illustration of tasks that may be carried out by a particular CPU core and a particular APU core during the PEI boot phase, according to another embodiment.

In some embodiments, the CPU may be used for executing the normal boot path, and the available APUs can be assigned for the task to initialize the Bluetooth/Wi-Fi stack in the late PEI phase. In case of a boot failure (e.g., no POST) condition, the APU may start creating the failure logs, collecting a dump of the NVRAM variables, etc. The crash dump logs may be collected and uploaded to a remote provisioned and secure Bluetooth/Wi-Fi device. Based on the event logs, the system can receive input from the secure remote device for quickly healing to recover the system. For example, the remote device may provide a service OS (SOS) to be executed on the local system to allow for remediation of any problems discovered.

In a symmetric processor environment, where multiple processors (or CPU cores) are present, running diagnostics during the pre-boot phase involves leveraging the capabilities of each processor to perform tests and gather diagnostic information. Using the MP service, the APIC ID of the available processors may be obtained. The necessary diagnostic code or routines that will be executed on each processor may then be loaded and initialized.

Tests may be distributed among the available processors to ensure that the workload is evenly distributed to maximize parallel execution. Using the function interface provided by the MP service, all available processors may start and complete their assigned work items in a synchronized manner.

Further, the results from each processor may be consolidated into a unified diagnostic report or summary. This report can be used for further analysis to take immediate action and provide faster root-cause analysis information. Thus, by leveraging the symmetric processor environment to distribute the diagnostic workload across multiple processors, parallel execution of f tests is enabled, and overall diagnostic efficiency and troubleshooting capabilities are enhanced.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
a host central processing unit (CPU); and
a non-CPU processing unit;
wherein the information handling system is configured to, during execution of a pre-boot environment:
during a first execution phase of the pre-boot environment, create a hand-off buffer (HOB) data structure including information regarding the host CPU and the non-CPU processing unit;
pass the HOB to a second execution phase of the pre-boot environment;
during the second execution phase, based on the HOB data structure, assign processes to the host CPU and the non-CPU processing unit;
perform boot tasks on the host CPU, wherein the boot tasks include performing a Trusted Platform Module (TPM) verification and initializing one or more hardware devices of the information handling system; and
perform diagnostic tasks on the non-CPU processing unit, wherein the diagnostic tasks include initializing a wireless interface of the information handling system and transmitting error information via the wireless interface.

2. The information handling system of claim 1, wherein the non-CPU processing unit is an application processing unit (APU).

3. The information handling system of claim 1, wherein the non-CPU processing unit is a graphics processing unit (GPU).

4. The information handling system of claim 1, wherein the pre-boot environment is a Unified Extensible Firmware Interface (UEFI) Basic Input/Output System (BIOS).

5. The information handling system of claim 1, wherein the diagnostic tasks include repeatedly monitoring execution of the pre-boot environment and reporting discrepancies to a remote information handling system.

6. A method comprising:
an information handling system that includes a host central processing unit (CPU) and a non-CPU processing unit executing a pre-boot environment;
during a first execution phase of the pre-boot environment, the information handling system creating a hand-off buffer (HOB) data structure including information regarding the host CPU and the non-CPU processing unit;
the information handling system passing the HOB to a second execution phase of the pre-boot environment;
during the second execution phase, based on the HOB data structure, the information handling system assigning processes to the host CPU and the non-CPU processing unit;
during execution of the pre-boot environment, the information handling system performing boot tasks on the host CPU, wherein the boot tasks include performing a Trusted Platform Module (TPM) verification and initializing one or more hardware devices of the information handling system; and
during execution of the pre-boot environment, the information handling system performing diagnostic tasks on the non-CPU processing unit, wherein the diagnostic tasks include initializing a wireless interface of the information handling system and transmitting error information via the wireless interface.

7. The method of claim 6, wherein the non-CPU processing unit is an application processing unit (APU).

8. The method of claim 6, wherein the non-CPU processing unit is a graphics processing unit (GPU).

9. The method of claim 6, wherein the pre-boot environment is a Unified Extensible Firmware Interface (UEFI) Basic Input/Output System (BIOS).

10. The method of claim 6, wherein the diagnostic tasks include repeatedly monitoring execution of the pre-boot environment and reporting discrepancies to a remote information handling system.

11. An article of manufacture comprising a non-transitory, computer-readable medium having computer-executable code thereon that is executable by at least one processor of an information handling system for:

executing a pre-boot environment;

during a first execution phase of the pre-boot environment, creating a hand-off buffer (HOB) data structure including information regarding a host central processing unit (CPU) and a non-CPU processing unit of the information handling system;

passing the HOB to a second execution phase of the pre-boot environment;

during the second execution phase, based on the HOB data structure, assigning processes to the host CPU and the non-CPU processing unit;

during execution of the pre-boot environment, performing boot tasks on the host CPU, wherein the boot tasks include performing a Trusted Platform Module (TPM) verification and initializing one or more hardware devices of the information handling system; and during execution of the pre-boot environment, performing diagnostic tasks on the non-CPU processing unit, wherein the diagnostic tasks include initializing a wireless interface of the information handling system and transmitting error information via the wireless interface.

12. The article of claim 11, wherein the non-CPU processing unit is an application processing unit (APU).

13. The article of claim 11, wherein the non-CPU processing unit is a graphics processing unit (GPU).

14. The article of claim 11, wherein the pre-boot environment is a Unified Extensible Firmware Interface (UEFI) Basic Input/Output System (BIOS).

15. The article of claim 11, wherein the diagnostic tasks include repeatedly monitoring execution of the pre-boot environment and reporting discrepancies to a remote information handling system.

* * * * *